United States Patent
Liu et al.

(10) Patent No.: US 12,436,875 B2
(45) Date of Patent: Oct. 7, 2025

(54) VEHICULAR DEVELOPMENT AND DEBUGGING SYSTEM AND METHOD FOR CONFIGURING PARAMETER FOR GRAPHIC PROGRAM

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 258 days.

(21) Appl. No.: 18/234,407

(22) Filed: Aug. 16, 2023

(65) Prior Publication Data

US 2025/0061051 A1 Feb. 20, 2025

(51) Int. Cl.
*G06F 11/3698* (2025.01)
(52) U.S. Cl.
CPC ................................ *G06F 11/3698* (2025.01)
(58) Field of Classification Search
CPC .......... G06F 8/34; G06F 8/41; G06F 11/3698; G06F 11/362; G06F 16/27; G06F 3/00; H04L 67/1097
See application file for complete search history.

(56) References Cited

U.S. PATENT DOCUMENTS 9,350,595 B1   5/2016  Yadav et al.
9,465,590 B2  10/2016  Ivanov et al.

(Continued)

FOREIGN PATENT DOCUMENTS

CN    1525312 A    9/2004
CN  103970855 B    5/2017

(Continued)

OTHER PUBLICATIONS

Pascal Minnerup et al.; Debugging Autonomous Driving Systems Using Serialized Software Components; IFAC; pp. 44-49; retrieved on Apr. 23, 2025 (Year: 2016).*

(Continued)

*Primary Examiner* — S. Sough
*Assistant Examiner* — Cuong V Luu
(74) *Attorney, Agent, or Firm* — Bayramoglu Law Offices LLC

(57) ABSTRACT

A vehicular development and debugging system includes a computer device, a bus adapter, or a burner. The computer device includes a processor, a readable storage medium, a communication bus and a communication interface; the readable storage medium is configured to store programs of performing the method of configuring a parameter for a graphic program, and the processor is configured to execute programs of performing the method of configuring a parameter for a graphic program so as to generate text codes; the processor, the readable storage medium and the communication interface communicate with the bus adapter via the communication bus; the processor is further configured to compile at least one fragment of execution codes in the text codes; the bus adapter is configured to write the compiled execution codes into a debugging device; or, the burner is configured to write the compiled execution codes into the debugging device.

10 Claims, 6 Drawing Sheets

S101: A parameter is configured for an execution unit, serialization operation is performed on a corresponding parameter configuration character string, and a serialized character string is displayed in a parameter correspondence table.

S102: Deserialization operation is performed on the serialized character string at the time of running the graphic program to obtain an actual parameter value desired by the execution unit in the graphic program.

(56) References Cited

U.S. PATENT DOCUMENTS

| | | | |
|---|---|---|---|
| 10,365,897 | B1 | 7/2019 | Shakeri et al. |
| 10,545,915 | B2 | 1/2020 | Barry et al. |
| 11,074,156 | B1 | 7/2021 | Lindblad et al. |
| 2004/0010794 | A1 | 1/2004 | Acott et al. |
| 2005/0076002 | A1 | 4/2005 | Williams et al. |
| 2013/0139134 | A1 | 5/2013 | Burka et al. |
| 2014/0337760 | A1 | 11/2014 | Heinrich et al. |
| 2016/0179475 | A1 | 6/2016 | Velummylum et al. |
| 2017/0132108 | A1* | 5/2017 | Valdez ............... G06F 11/362 |
| 2018/0285476 | A1 | 10/2018 | Siciliano et al. |
| 2021/0073285 | A1 | 3/2021 | Hunter |
| 2023/0051879 | A1 | 2/2023 | Miyanaga |
| 2024/0012626 | A1 | 1/2024 | Hoshi |
| 2024/0184861 | A1 | 6/2024 | Hong et al. |
| 2024/0403049 | A1 | 12/2024 | Liu et al. |
| 2024/0403189 | A1 | 12/2024 | Liu et al. |

FOREIGN PATENT DOCUMENTS

| | | | |
|---|---|---|---|
| CN | 107451237 | A | 12/2017 |
| CN | 107463668 | B | 3/2019 |
| CN | 110221828 | A | 9/2019 |
| CN | 110275789 | A | 9/2019 |
| CN | 111538786 | A * | 8/2020 ............. G06F 16/27 |
| CN | 112989139 | A | 6/2021 |
| CN | 109343836 | B | 9/2021 |
| CN | 113505061 | A | 10/2021 |
| CN | 114169311 | A | 3/2022 |
| CN | 114661806 | A | 6/2022 |
| CN | 114675613 | A | 6/2022 |
| CN | 114691105 | A | 7/2022 |
| CN | 114895945 | A | 8/2022 |
| CN | 115237415 | A | 10/2022 |
| CN | 115857905 | A | 3/2023 |
| CN | 116225578 | A | 6/2023 |
| CN | 116360887 | A | 6/2023 |
| CN | 116796330 | A | 9/2023 |
| CN | 117171042 | A | 12/2023 |
| CN | 117973322 | A | 5/2024 |
| EP | 3032436 | A1 * | 6/2016 ........... G06F 16/221 |
| JP | 2019125198 | A | 7/2019 |
| WO | 2019050638 | A1 | 3/2019 |
| WO | 2022230809 | A1 | 11/2022 |

OTHER PUBLICATIONS

Wang X; translated CN 111538786 A (Year: 2020).*

* cited by examiner

VEHICULAR DEVELOPMENT AND DEBUGGING SYSTEM AND METHOD FOR CONFIGURING PARAMETER FOR GRAPHIC PROGRAM

TECHNICAL FIELD

The present disclosure relates to the field of vehicular software development technologies and in particular to a method and a system for configuring a parameter for a graphic program and a vehicular development and debugging system.

BACKGROUND

When graphic program configures parameters for each execution unit, the graphic program sets corresponding ingresses for different parameters based on different parameter types. For different parameter types, it is required to establish different parameter objects, which may affect development efficiency.

The reason why different parameter objects are established for different parameter types is as follows:

The graphic program is usually formed of connection lines with arrows between blocks of different shapes. The blocks may be referred to as "execution units", and the connection lines with arrows between the blocks represent a flow direction of logic or data.

The execution units are usually used to execute specific actions, for example, Application Program Interface (API) function call, value assignment, logic arithmetic operation and the like. The targets these actions rely on or operate for are referred to as "parameters".

The parameters have different types, such as digit type, character string type, object type and the like.

SUMMARY

The present disclosure provides a vehicular development and debugging system and method based on parameter configuration for a graphic program, where,
the present disclosure provides a vehicular development and debugging system, including: a computer device, a bus adapter, or a burner, wherein
the computer device includes a processor, a readable storage medium, a communication bus and a communication interface, where,
the readable storage medium is configured to store programs of performing the method of configuring a parameter for a graphic program as mentioned above, and the processor is configured to execute programs of performing the method of configuring a parameter for a graphic program as mentioned above, so as to generate text codes;
the processor, the readable storage medium and the communication interface communicate with the bus adapter via the communication bus;
the processor is further configured to compile at least one fragment of execution codes in the text codes;
the bus adapter is configured to write the compiled execution codes into a debugging device; or,
the burner is configured to write the compiled execution codes into the debugging device.

The contents of the present disclosure aim to provide brief descriptions for the subject described in the specification. Therefore, it should be understood that the above features are merely illustrative and shall not be interpreted as narrowing the scope or essence of the described subject of the specification in any way.

Other features, aspects and advantages of the subject described in the specification will become apparent by way of following specific embodiments, accompanying drawings and claims.

BRIEF DESCRIPTION OF THE DRAWINGS

In order to more clearly describe the technical solutions in the specific embodiments of the present disclosure or the prior arts, the drawings required for descriptions of the specific embodiments or the prior arts will be briefly introduced. Apparently, the drawings described hereunder are only some embodiments of the present disclosure. Those skilled in the art can also obtain other drawings based on these drawings without making creative work.

DETAILED DESCRIPTION OF THE EMBODIMENTS

Figures 1, 2, 3:
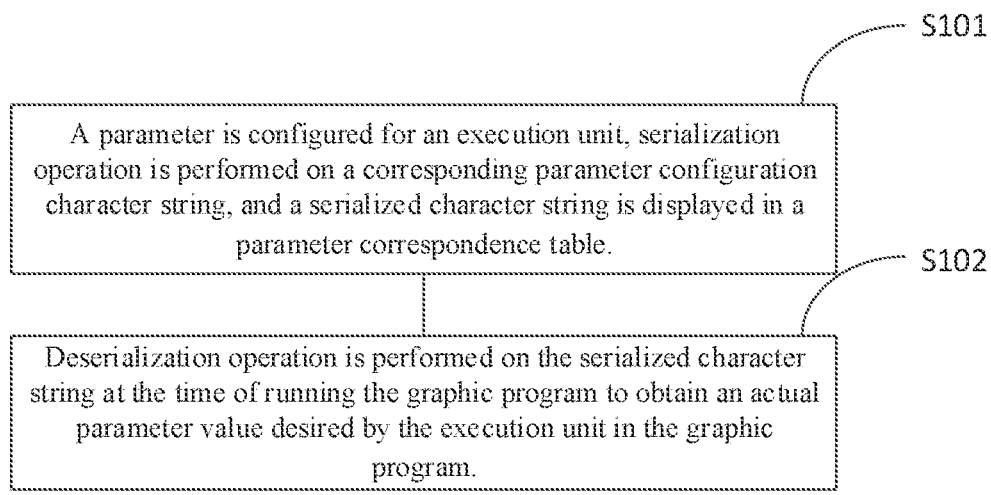
FIG. 1 is a diagram illustrating steps for a method of configuring a parameter for a graphic program according to some embodiments of the present disclosure.
FIG. 2 is a schematic diagram illustrating an interface on which a double type parameter AValue is already configured as a local variable v0 in a case involved in some embodiments of the present disclosure.
FIG. 3 is a schematic diagram illustrating an interface on which a double type parameter AValue is already configured as a CAN signal in a case involved in some embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

In the related arts, if a graphic program is to add one execution unit, it is required to configure desired parameters for the execution unit. Since different parameters require transmission of different types, a user needs to claim a parameter object to be transmitted for each type and complete the setting of the parameter object prior to transmission of the parameters, and otherwise, an error of parameter mismatch will occur, which prevents normal operation of the graphic program.

This problem will become more obvious especially in the graphic program during a vehicle development process. The user needs to determine whether a vehicle speed is less than a set vehicle speed C. Traditionally, the user needs to firstly apply for a variable v, and then obtain a current vehicle speed signal through a simulation engine or a signal manager provided by a system (it is to be noted that the system and the systems mentioned subsequently all refer to a computer software containing the graphic program), and assign AValue of the vehicle speed signal to the variable v; at the same time, the user also needs to apply for a variable c, and obtain AValue of the set vehicle speed C through a parameter manager provided by the system, and assign the value to the variable c. Finally, the variables v and c are input as parameters into an execution unit for determining a vehicle speed. During development, if there are a large number of execution units with parameters, the development efficiency will be significantly reduced.

Hence, the method of configuring a parameter for a graphic program according to at least one embodiment has higher efficiency, which is specifically embodied in that the user can perform parameter configuration based directly on character string, such that the parameter configuration process is simplified to text type parameter configuration. In a scenario of automatic batch generation or configuration sharing, the character string type parameters have inherent speed advantage.

Specifically, at least one embodiment provides a method of configuring a parameter for a graphic program, including: configuring a parameter for an execution unit, performing serialization operation on the configured parameter, and displaying a serialized character string in a parameter correspondence table; performing deserialization operation on the serialized character string at the time of running the graphic program to obtain an actual parameter value desired by the execution unit in the graphic program.

It is noted that when a computer software system containing a graphic program involved in some embodiments is designed, a parameter configuration type of an execution unit in the graphic program is set to character string; on this basis, in at least one embodiment, a user can perform parameter configuration based directly on character string such that the parameter configuration process is simplified to text type parameter configuration.

Furthermore, in some embodiments, the type prefixes are associated with the corresponding parameter types, such that for different parameter configurations and parameter running, the system can perform bidirectional switching for the corresponding parameter configuration character strings provided by the user, without needing to set one variable for each parameter as before, for example, firstly obtain a variable value and then transmit it to the execution unit. The configuration of the character strings can be supported by a parameter configuration module of the graphic program, and thus the user can complete parameter configuration by simply clicking the corresponding add button and selecting the desired parameter configuration character string in the parameter manager, thus effectively enhancing the development efficiency of the graphic program.

Various non-limiting implementations of the embodiments of the present disclosure will be detailed below in combination with drawings.

As shown in FIG. 1, one or more embodiments of the present disclosure provide a method of configuring a parameter for a graphic program, which includes the following steps.

At step S101, a parameter is configured for an execution unit, serialization operation is performed on a parameter configuration character string associated with the parameter, and a serialized character string is displayed in a parameter correspondence table associated with the parameter.

In some embodiments, the serialization operation includes: in a serialization process, obtaining a serialized character string by adding a type prefix to a parameter configuration character string, where an expression of the serialized character string includes a first part which is the type prefix and a second part which is the parameter configuration character string.

Specifically, the first part and the second part are separated by a specifier. As an alternative example, brackets, quotation marks or vertical bar separators or the like are added as specifier to the first part, with the display effect of, for example, [type prefix] parameter configuration character string, "type prefix" parameter configuration character string, and |type prefix|parameter configuration character string. It is to be noted that, the cases involved in some embodiments will be described with the display effect of "[type prefix] parameter configuration character string" as an example.

Specifically, the parameter configuration character string associated with each parameter is set by a user.

The method of serialization operation is detailed below in combination with cases.

As shown in FIG. 2, the method of configuring a double type parameter AValue of an execution unit in a graphic program is taken as an example.

As one case, when AValue of a local variable v0 is to be assigned to the parameter AValue, it is desired to add the local variable v0 by clicking the corresponding add button (as an alternative, the add button may be an arrow button at the right of the parameter value input box) in a parameter value input box corresponding to the parameter AValue; after the addition is completed, "[Var]v0" is displayed in the parameter value input box; where [Var] is a type prefix which represents AValue of the local variable, and "v0" following the type prefix may be a user-set parameter configuration character string; "[Var]v0" is a serialized character string which entirely represents the value of the local variable v0.

As another case, when AValue of a signal Signal1 of a message Message1 of a node Node1 in a vehicle CAN network Network1 connected with a program channel 1 is assigned to the parameter AValue, it is desired to add the value of the CAN signal by clicking the corresponding add button in the parameter value input box corresponding to the parameter AValue. As shown in FIG. 3, after the addition is completed, "[CAN]0/Network1/Node1/Message1/Signal1" is displayed in the parameter value input box; where [CAN] is a type prefix, which represents AValue of the CAN signal, and "0/Network1/Node1/Message1/Signal1" following the type prefix is a parameter configuration character string, which means that: since the channel index where the signal is located starts from 0, 0 represents a channel 1, and 1 represents a channel 2 and so on; Network1 is a network name, Node1 is a node name, Message1 is a message name, and Signal1 is a signal name; "[CAN]0/Network1/Node1/

Message1/Signal1" is a serialized character string which entirely represents AValue of the CAN signal.

In some embodiments, the serialization operation further includes in a serialization process, firstly determining whether the parameter configuration character string is a non-immediate number; if the parameter configuration character string is a non-immediate number, obtaining a serialized character string by adding a type prefix to the parameter configuration character string, or directly taking the parameter configuration character string as a serialized character string.

Specifically, the non-immediate number refers to a character string other than the immediate number, where the immediate number includes, for example, a digit type and a character string type; the digit type is, for example, 1234 and 45.67 and the like, and the character string type is, for example, abcde and the like.

The method of the serialization operation in which the parameter configuration character string is not a non-immediate number will be detailed in combination with the cases.

As one case, the method of configuring a double type parameter AValue of an execution unit in a graphic program is taken as an example.

When a digit 100 is assigned to the parameter AValue, "100" is input in the parameter value input box corresponding to the parameter AValue, without adding a type prefix before "100" during serialization operation.

As another case, the method of configuring a character string type parameter AString of an execution unit in a graphic program is taken as an example.

When a word "Vehicle" is to be assigned to the parameter AString, "Vehicle" is input in the parameter value input box corresponding to the parameter AString, without adding a type prefix before "Vehicle" during serialization operation.

At step S102, deserialization operation is performed on the serialized character string at the time of running the graphic program to obtain an actual parameter value desired by the execution unit in the graphic program.

In some embodiments, performing deserialization operation on the serialized character string at the time of running the graphic program includes: in a deserialization process, firstly determining whether a type prefix is present in the serialized character string; if a type prefix is present, extracting the type prefix to identify a parameter type, and performing deserialization operation on the parameter configuration character string based on the parameter type to obtain an actual parameter value.

The method of the deserialization operation will be detailed below in combination with cases.

For example, the serialized character string is "[CAN]0/Network1/Node1/Message1/Signal1". It is firstly determined whether a type prefix is present in the character string and then the type of the type prefix is identified. In this example, the type prefix [CAN] represents AValue of the CAN signal, and a serialized CAN signal follows the type prefix.

In this example, deserialization operation can be performed on the parameter configuration character string "0/Network1/Node1/Message1/Signal1" in the following process.

Firstly, it is known based on the type prefix [CAN] that the serialized parameter is CAN signal type, and deserialization operation specific to the CAN signal is performed. In the operation, the parameter configuration character string is firstly separated by using the separator "/" into five sub-character strings, which respectively are (1) 0, (2) Network1, (3) Node1, (4) Message1 and (5) Signal1. If the number of the sub-character strings obtained by separation is less than or more than 5, it indicates that the serialization information is illegal and the called parameter is illegal, and thus the call is failed.

Secondly, in the five sub-character strings obtained by parse in the deserialization operation specific to the CAN signal, the sub-character string (1) represents a logic channel index which starts from 0, where 0 represents a channel 1; the sub-character string (2) represents a network name, which is obtained as Network1 in this example; the sub-character string (3) represents a node name, which is obtained as Node1 in this example; the sub-character string (4) represents a message name, which is obtained as Message1 in this example; and the sub-character string (5) represents a signal name, which is obtained as Signal1 in this example. Based on the five pieces of obtained basic information, the value of the signal Signal1 in the message Message1 in the node Node1 in the network Network1 in the channel 1 is finally accessed through the CAN bus simulation engine.

In some embodiments, the method of configuring a parameter for a graphic program further includes: establishing a correspondence between type prefix and parameter type. Establishing the correspondence between type prefix and parameter type includes: constructing a correspondence table of type prefix and parameter type.

In some implementation cases, the correspondence between type prefix and parameter type is, for example, not limited to the Table below.

| SN | Type prefix | Parameter type | Instances |
|---|---|---|---|
| 1 | [Var] | Local variable | [Var]v1 |
| 2 | [Sys] | System variable | [Var]SysVar1 |
| 3 | [CAN] | CAN signal | [CAN]0/Network 1/Node 1/Message 1/Signal 1 |
| 4 | [LIN] | LIN signal | [LIN]1/Network2/Node2/Frame2/Signal2 |
| 5 | [ETH] | Ethernet signal | [ETH]2/Network3/Node3/Frame3/Signal3 |
| 6 | [FlexRay] | FlexRay Signal | [FlexRay]3/Network4/Node4/Frame4/Signal4 |
| 7 | [CANMsg] | CAN message | [CANMsg]{0, 0x1, 8, 0, 0x123, 0, {0x01, 0x02, 0x03, 0x04, 0x05, 0x06, 0x07, 0x08}} |
| 8 | [LINMsg] | LIN message | [LINMsg]{0, 0x0, 0x0, 8, 0x12, 0x0, 0, 0, {0x01, 0x02, 0x03, 0x04, 0x05, 0x06, 0x07, 0x08}} |
| 9 | [FlexRayMsg] | FlexRay message | [FlexRayMsg] {0, 1, 0, 15, 15, 3, 5, 0, 0x0, 0x0, 0x0, 11, 0x2, 0x0, 0, 0, 0, {0x01, 0x02, 0x03, 0x04, 0x05, 0x06, 0x07, 0x08}} |
| 10 | [ETHMsg] | Ethernet message | [ETHMsg]{0, 1, 0, 0, {0x0, 0x1, 0x2, 0x3, 0x4, 0x5}, {0x1, 0x2 0x3, 0x4, 0x5, 0x6}, 0x1234, 0x4567, 0, 0x8, { 0x01, 0x02, 0x03, 0x04, 0x05, 0x06, 0x07, 0x08}} |
| 11 | [Const] | System constant | [Const]CONST_LOG OK |
| 12 | [Path] | Path parameter | [Path]C:\LC Ramdisk |

In some embodiments, the parameter type at least includes one or more of signal parameter, system variable, local variable, system constant and path parameter.

In some implementation cases, the parameter types, the corresponding instances and the instance interpretations are not limited to the Table below.

| Parameter types and corresponding instances | Parameter type instance interpretations |
|---|---|
| Local variable: [Var]v1 | v1: local variable name |
| System variable: [Var]Sys Var1 | Sys Var1: system variable name |
| Signal parameter:<br><br>[CAN]0/Network 1/Node 1/Message 1/Signal 1 | 0: CAN logic channel index, starting from 0, where here is CAN logic channel 1.<br>Network 1: CAN network 1<br>Node 1: CAN node 1<br>Message 1: CAN message 1<br>Signal 1: CAN signal 1 |
| Signal parameter:<br>[LIN]1/Network2/Node2/Frame2/Signal2 | 0: LIN logic channel index, starting from 0, where here is LIN logic channel 2;<br>Network2: LIN network 2<br>Node2: LIN node 2<br>Frame2: LIN frame 2<br>Signal2: LIN signal 2 |
| Signal parameter:<br>[ETH]2/Network3/Node3/Frame3/Signal3 | 0: Ethernet logic channel index, starting from 0, where here is Ethernet logic channel 3;<br>Network3: Ethernet network 3<br>Node3: Ethernet node 3<br>Frame3: Ethernet frame 3<br>Signal3: Ethernet signal 3 |
| Signal parameter:<br>[FlexRay]3/Network4/Node4/Frame4/Signal4 | 0: FlexRay logic channel index, starting from 0, where here is FlexRay logic channel 4.<br>Network4: FlexRay network 4<br>Node4: FlexRay node 4<br>Frame4: FlexRay frame 4<br>Signal4: FlexRay signal 4 |
| Signal parameter:<br>[CANMsg]{0, 0x1, 8, 0, 0x123, 0, {0x01, 0x02, 0x03, 0x04, 0x05, 0x06, 0x07, 0x08}} | 0: CAN logic channel index, starting from 0,where here is CAN logic channel 1.<br>0x1: CAN message flag register<br>8: CAN message DLC = 8<br>0: CAN FD message flag register<br>0x123: CAN message identifier<br>0: CAN message timestamp, in the unit of ms<br>{0x01, 0x02, 0x03, 0x04, 0x05, 0x06, 0x07, 0x08}:<br>8 data bytes, which are 0x01, 0x02, 0x03, 0x04, 0x05, 0x06, 0x07, 0x08 |
| Signal parameter:<br>[LINMsg]{ 0, 0x0, 0x0, 8, 0x12, 0x0, 0, 0, {0x01, 0x02, 0x03, 0x04, 0x05, 0x06, 0x07, 0x08}} | 0: LIN logic channel index, starting from 0, where here is LIN logic channel 1.<br>0x0: error state register<br>0x0: LIN message flag register<br>8: LIN message DLC = 8<br>0x12: LIN message identifier<br>0x0: LIN message check sum<br>0: LIN message state register<br>0: LIN message timestamp, in the unit of ms<br>{0x01, 0x02, 0x03, 0x04, 0x05, 0x06, 0x07, 0x08}:<br>8 data bytes, which are 0x01, 0x02, 0x03, 0x04, 0x05, 0x06, 0x07, 0x08 |
| Signal parameter: [FlexRayMsg]<br>{0, 1, 0, 15, 15, 3, 5, 0, 0x0, 0x0, 0x0, 11, 0x2, 0x0, 0, 0, 0, {0x01, 0x02, 0x03, 0x04, 0x05, 0x06, 0x07, 0x08}} | 0: FlexRay logic channel index, starting from 0, where here is FlexRay logic channel 1.<br>1: FlexRay Channel Mask<br>0: FlexRay message direction<br>15: FlexRay Payload length<br>15: FlexRay Payload actual length<br>3: FlexRay Cycle Number<br>5: FlexRay CC type<br>0: FlexRay frame type<br>0x0: FlexRay A channel Header check sum<br>0x0: FlexRay B channel Header check sum<br>0x0: FlexRay fault register<br>11: FlexRay Slot Id<br>0x2: FlexRay message flag register<br>0x0: FlexRay message CRC<br>0: FlexRay message retention field 1<br>0: FlexRay message retention field 2<br>0: FlexRay message timestamp, in the unit of ms<br>{0x01, 0x02, 0x03, 0x04, 0x05, 0x06, 0x07, 0x08}:<br>8 data bytes: which are 0x01, 0x02, 0x03, 0x04, 0x05, 0x06, 0x07, 0x08 |
| Signal parameter:<br>[ETHMsg]{0, 1, 0, 0, {0x0, 0x1, 0x2, 0x3, 0x4, 0x5}, {0x1, 0x2, 0x3, 0x4, 0x5, 0x6}, 0x1234, 0x4567, 0, 0x8, { 0x01, 0x02, 0x03, 0x04, 0x05, 0x06, 0x07, 0x08}} | 0: Ethernet logie channel index, starting from 0, where here is FlexRay logic channel 1.<br>1: Ethernet message direction<br>0: Ethernet message type<br>0: Ethernet message retention field 1<br>{0x0, 0x1, 0x2, 0x3, 0x4, 0x5}: source MAC address<br>{0x1, 0x2, 0x3, 0x4, 0x5, 0x6}: destination MAC address<br>0x1234; Ethernet TPID<br>0x4567: Ethernet TCI |

| Parameter types and corresponding instances | Parameter type instance interpretations |
|---|---|
| | 0: Ethernet message timestamp, in the unit of ms |
| | 0x8: Ethernet message payload length |
| | {0x01, 0x02, 0x03, 0x04, 0x05, 0x06, 0x07, 0x08}: |
| | 8 data bytes: which are 0x01, 0x02, 0x03, 0x04, |
| | 0x05, 0x06, 0x07, 0x08 |
| System constant: | CONST_LOG_OK: system constant character string |
| [Const]CONST_LOG_OK | expression |
| Path parameter: | C:\LC_Ramdisk: LC_Ramdisk folder at the root |
| [Path]C:\LC_Ramdisk | directory of local computer C disk |

The process of configuring a parameter for a graphic program in some embodiments will be detailed below in combination with complete cases.

It is assumed that a user needs to call a function to set AValue of one system variable "GearVar", and the prototype of the function is as follows: app.set_system_var_double (const char*ACompleteName, constdoubleAValue);
- the function name is app.set_system_var_double;
- the function has two parameters, which are AComplete-Name, which is a character string type and is the name of the to-be-set system variable; and AValue which is a dual-accuracy double type and is a to-be-set value.

The steps of the parameter configuration process are described below.

At step S201, the function app.set_system_var_double is selected; and then, the system automatically identifies two parameter names and types of the function and presents the two parameters in the form of table in the parameter correspondence table; the user needs to configure parameters in the column of the parameter value in the parameter correspondence table as follows:

| No. | Parameter name | Parameter value |
|---|---|---|
| 1 | ACompleteName | Empty |
| 2 | AValue | Empty |

At step S202, the user firstly configures the parameter ACompleteName. The user opens the parameter manager and opens the system variable selector by the parameter manager and selects the system variable "GearVar" in the system variable selector and confirms the selection.

At step S203, the parameter manager, based on the selection of the user, automatically generates a serialized character string "GearVar", and inputs it into the parameter value column corresponding to the "ACompleteName" row.

At step S204, the user continues to configure the parameter AValue. It is assumed that the user needs to take AValue of a specific gear signal "Gear" on the bus as a parameter value. The user opens the system manager, selects the CAN channel 1, finds the CAN network "Powertrain" in the channel 1, unfolds the network, selects the node "Engine" therein, unfolds the node, and selects the message "EngineData" sent by it, and unfolds the message, and selects the signal "Gear" in the message and confirms the selection.

At step S205, the parameter manager, based on the selection of the user, automatically generates a serialized character string "[CAN]0/Powertrain/Engine/EngineData/Gear" and inputs it into the parameter value column corresponding to the "AValue" row.

At step S206, the configuration of the parameter correspondence table is completed and the configured parameter correspondence table is shown below.

| No. | Parameter name | Parameter value |
|---|---|---|
| 1 | ACompleteName | GearVar |
| 2 | AValue | [CAN]0/Powertrain/Engine/EngineData/Gear |

When the parameter configuration is completed and the graphic program is run, each execution unit in the graphic program executes a corresponding command based on the actual parameter value obtained by deserialization.

Figure 4:
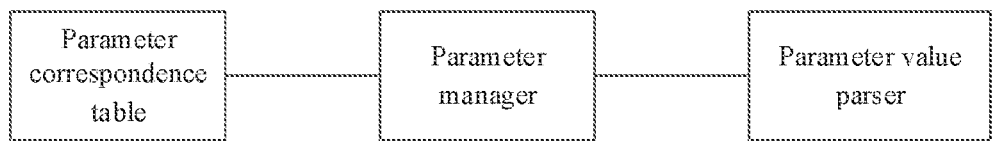
FIG. 4 is a principle block diagram illustrating an apparatus for configuring a parameter for a graphic program according to some embodiments of the present disclosure.

With reference to FIG. 4, one or more embodiments of the present disclosure provide an apparatus for configuring a parameter for a graphic program, including a computer, where the computer is configured to include:
- a parameter manager, configured to configure a parameter for an execution unit, and perform serialization operation on a parameter configuration character string associated with the parameter.

Specifically, the contents of the serialization operation can be referred to the above contents and will not be repeated herein.

The apparatus further includes a parameter correspondence table, configured to display a parameter name associated with the parameter and a serialized character string.

In one implementation, the parameter correspondence table is a table consisting of three columns, where the first row of each column is a column title.

The first column is a parameter serial number column, and the column title is "No." and the column contents are pure digits, which count from 1 and are automatically input by system;

The second column is a parameter name column, the column tile is "parameter name", and the column contents are names of signals or function parameters to be set, which are automatically input by system based on actual situations.

The third column is a parameter value column, and the column title is "parameter value" and the column contents are parameters to be configured by user. The parameters may be manually input by user or automatically input by selection of the parameter selector.

The parameter correspondence table is exemplified below.

| No. | Parameter name | Parameter value |
|---|---|---|
| 1 | ACompleteName | Gear Var |
| 2 | AValue | [CAN]0/Powertrain/Engine/EngineData/Gear |

The apparatus further include a parameter value parser, configured to perform deserialization operation on the serialized character string to obtain an actual parameter value desired by the execution unit in the graphic program.

Specifically, the contents of the deserialization operation can be referred to the above contents and will not be repeated herein.

Figure 5:
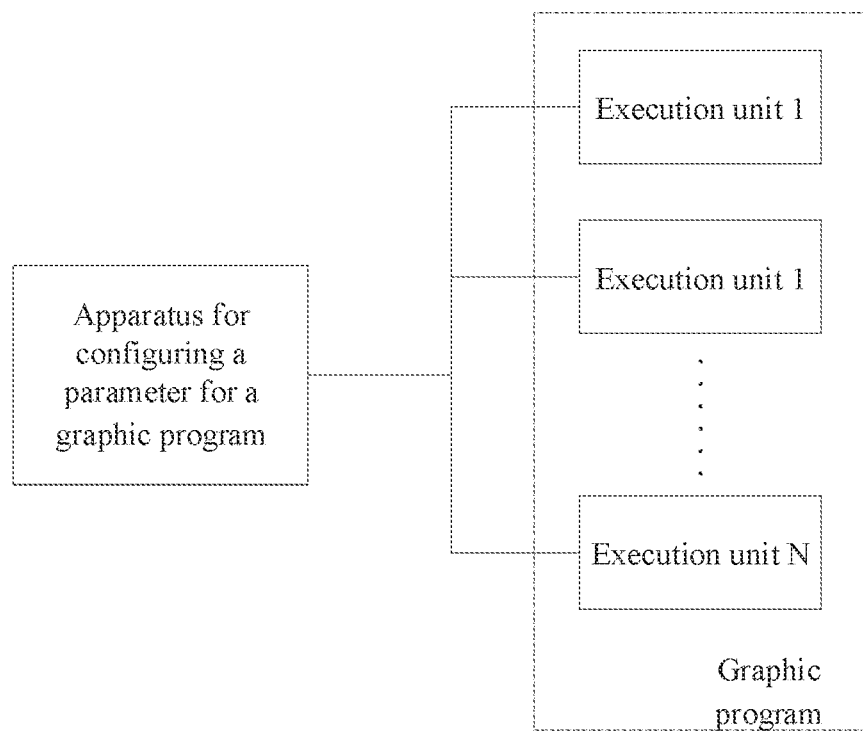
FIG. 5 is a principle block diagram illustrating a system for configuring a parameter for a graphic program according to some embodiments of the present disclosure.

With reference to FIG. 5, as one possible implementation, one or more embodiments of the present disclosure further provide a system for configuring a parameter for a graphic program, which includes the apparatus for configuring a parameter for a graphic program as mentioned above; a graphic program, including at least one execution unit; where the execution unit is applicable to obtaining a corresponding desired actual parameter value.

Specifically, in some embodiments, a parameter configuration module can quickly and easily configure a parameter for each execution unit in the graphic program, and when the graphic program is run, quickly and easily provide a desired actual parameter value for each execution unit in the graphic program, effectively increasing the development efficiency of the graphic program.

In some embodiments, the apparatus for configuring a parameter for a graphic program and the function of the graphic program can be implemented in a processor, which specifically can be referred to the specific descriptions of the method of configuring a parameter for a graphic program. Thus, no redundant descriptions are made herein.

One or more embodiments further provide a method of configuring a parameter for a vehicular graphic program, which includes: configuring a vehicular parameter for an execution unit, performing serialization operation on a vehicular parameter configuration character string associated with the vehicular parameter, and displaying a serialized character string in a parameter correspondence table associated with the vehicular parameter; performing deserialization operation on the serialized character string at the time of running the graphic program to obtain an actual vehicular parameter value desired by the execution unit in the graphic program.

In some embodiments, the application scenario of the method of configuring a parameter for a vehicular graphic program includes a vehicle development scenario and a vehicle test scenario.

The method of configuring a parameter for a graphic program in the vehicle development scenario will be detailed below in combination with cases.

Specifically, in a graphic program development process of vehicle algorithm, it is required to carry out determination logic to determine whether a signal value is within a specified range. If the signal is within the specified range, logic A is performed, and otherwise, logic B is performed. For example, it is determined whether an engine rotation speed signal is between 1000 rotations and 3000 rotations. If the engine rotation speed signal is a signal named EngSpeed on the FlexRay bus, the signal is in the message EngineData and sent by the Engine node, where the node is located in the database Powertrain which is located in the channel 2.

When the determination logic is carried out, the determined signal parameter can be configured by the parameter manager in the following steps.

At step S301, by use of the parameter manager, the FlexRay type button is firstly clicked, and then the channel 2, the FlexRay network Powertrain, the node Engine, the message EngineData, and the signal EngSpeed are selected sequentially on the pop-up FlexRay signal selector, and then confirmed.

At step S302, the parameter manager automatically performs serialization on the signal, where the serialized character string is "[FlexRay]1/Powertrain/Engine/EngineData/EngSpeed".

The type prefix [FlexRay] represents the signal is one FlexRay signal, and the parameter configuration character string following the type prefix is separated by "/", and composed of five elements:
(1) 1 represents channel 2 (starting from 0);
(2) Powertrain represents a network name;
(3) Engine represents a node name;
(4) EngineData represents a message name;
(5) EngSpeed represents a signal name.

The method of configuring a parameter for a graphic program in the vehicle test scenario will be detailed below in combination with cases.

Specifically, in a vehicle test, the graphic program function "test.check_verdict" is used to determine whether a target signal is within a specified range. The function has four parameters. When the user selects to call the function, the system automatically displays the following parameter table of the function below:

| No. | Parameter name | Parameter value |
|-----|----------------|-----------------|
| 1   | AName          | Empty           |
| 2   | AValue         | Empty           |
| 3   | AMin           | Empty           |
| 4   | AMax           | Empty           |

AName represents description of a content to be determined. The content is a character string which can be input in a test report, for example, "engine rotation speed EngSpeed";

AValue represents a signal value to be determined, for example, engine rotation speed read from the FlexRay bus;

AMin represents a minimum value of a determination range;

AMax represents a maximum value of a determination range.

When the user calls the function, parameter configuration can be performed in the following steps.

At step S401, during AName configuration, "engine rotation speed EngSpeed" is directly input in the corresponding parameter value column.

At step S402, during AValue configuration, by use of the parameter manager, the FlexRay type button is firstly clicked, and then the channel 3 the FlexRay network Powertrain, the node Engine, the message EngineData, and the signal EngSpeed are selected sequentially on the pop-up FlexRay signal selector, and then confirmed.

At step S403, the parameter manager automatically performs serialization on the signal, where the serialized character string is "[FlexRay]2/Powertrain/Engine/EngineData/EngSpeed"; and then inputs the serialized character string into the parameter value column corresponding to AValue in the parameter table.

At step S404, during AMin configuration, the user can select a test parameter "RangeMin" in the system variable; the user, by use of the parameter manager, firstly clicks the system variable type button, and then selects the system variable "RangeMin" in the pop-up system variable selector and then confirms the selection.

At step S405, the parameter manager automatically performs serialization on the system variable, where the serialized character string is "[Sys]RangeMin"; and then inputs the serialized character string into the parameter value column corresponding to AMin in the parameter table.

At step S406, during AMax configuration, the user may select a test parameter "RangeMax" in the system variable; by use of the parameter manager, the user firstly clicks the system variable type button, and then selects the system variable "RangeMax" in the pop-up system variable selector, and confirms the selection.

At step S407, the parameter manager automatically performs serialization on the system variable, where the serialized character string is "[Sys]RangeMax"; and then inputs the serialized character string into the parameter value column corresponding to AMax in the parameter table.

In some embodiments, the specific steps of configuring a parameter for a vehicular graphic program are same as the steps of the method of configuring a parameter for a graphic program, and will not be repeated herein.

Figure 6:
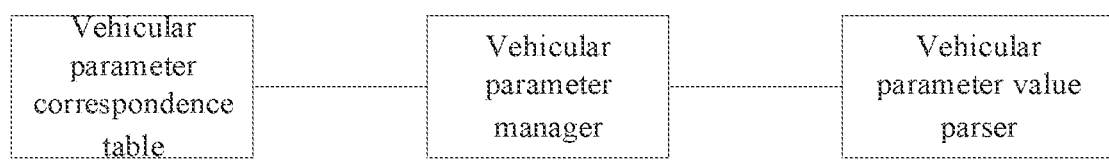
FIG. 6 is a principle block diagram illustrating an apparatus for configuring a parameter for a vehicular graphic program according to some embodiments of the present disclosure.

As shown in FIG. 6, one or more embodiments of the present disclosure further provide an apparatus for configuring a parameter for a vehicular graphic program, which includes a computer, where the computer is configured to include:

a vehicular parameter manager, configured to configure a vehicular parameter for an execution unit, and perform serialization operation on a vehicular parameter configuration character string associated with the vehicular parameter;

a vehicular parameter correspondence table, configured to display a vehicular parameter name associated with the vehicular parameter and a serialized character string;

a vehicular parameter value parser, configured to perform deserialization operation on the serialized character string to obtain an actual vehicular parameter value desired by the execution unit in the vehicular graphic program.

The functions of the vehicular parameter manager, the vehicular parameter correspondence table and the vehicular parameter value parser are same as the functions of the above parameter manager, the parameter correspondence table and the parameter value parser and will not be repeated herein.

In some embodiments, the specific functions of the vehicular parameter manager, the vehicular parameter correspondence table and the vehicular parameter value parser in the apparatus for configuring a parameter for a vehicular graphic program are implemented in a processor or computer, which can be referred to the specific descriptions of the method of configuring a parameter for a graphic program and will not be repeated herein.

An electronic device in some embodiments of the present disclosure will be described below from the perspective of the hardware processing.

The embodiments do not limit the specific implementation of the electronic device.

Figure 7:
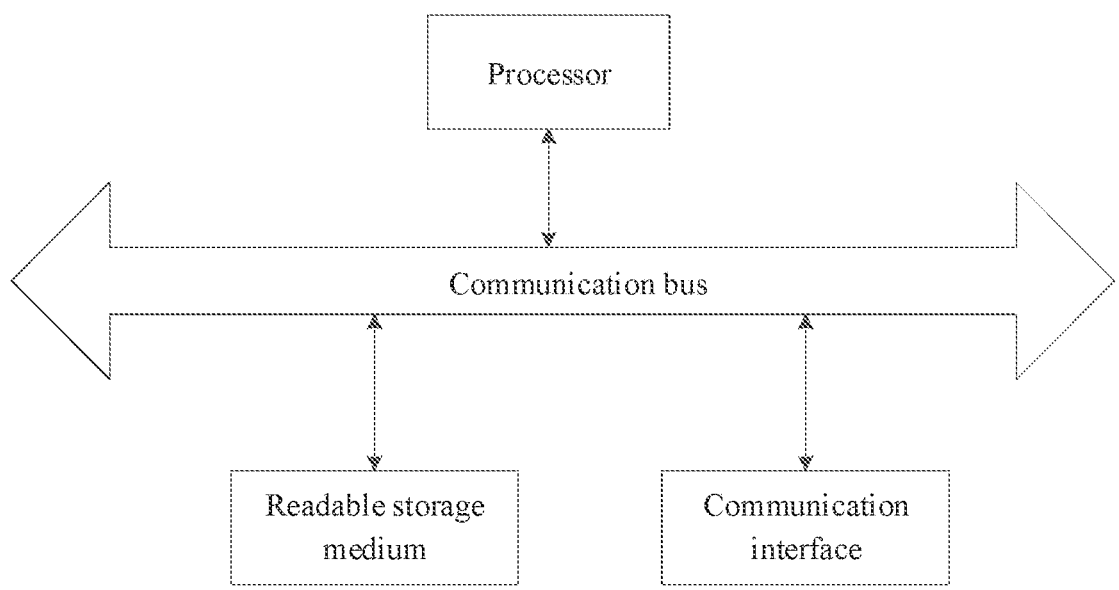
FIG. 7 is a principle block diagram illustrating an electronic device according to some embodiments of the present disclosure.

As shown in FIG. 7, the electronic device includes: a processor, a readable storage medium, a communication bus and a communication interface. The processor, the readable storage medium and the communication interface communicate with each other via the communication bus. The readable storage medium is configured to store programs of performing the method of configuring a parameter for a graphic program as mentioned above, and the processor is configured to execute programs of performing the method of configuring a parameter for a graphic program as mentioned above.

In other embodiments, a computer device, and an industrial personal computer may be one of the electronic devices.

The structure shown in FIG. 7 does not constitute any limitation to the electronic device and thus may include more or less components than shown in the drawings or combine some components or have different components deployed.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as wireless fidelity (WI-FI) interface, Bluetooth interface and the like), which is usually used to establish communication connection between the computer device and other electronic devices.

The readable storage medium or the computer readable storage medium includes at least one type of memories. The memory includes flash memory, hard disk drive, multimedia card, card type memory (e.g. Secure Digital Memory (SD memory) or Memory Data Register (DX) or the like), magnetic memory, magnetic disk or compact disk or the like. In some embodiments, the memory may be an internal storage unit in the computer device, for example, a hard disk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit and the external storage device in the computer device. The memory may be used to not only store an application software installed on the computer device and various types of data, for example, the codes of the computer programs and the like but also temporarily store data already output or to be output.

In some embodiments, the processor may be a central processing unit (CPU), a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

When executing the above programs, the processor performs the steps in the embodiment of the method of configuring a parameter for a graphic program as shown in FIG. 1, for example, the steps S101 to S102 shown in FIG. 1. Alternatively, the processor executes the computer programs to realize the functions of the modules or units in each apparatus embodiment.

In some embodiments, the processor is specifically configured to perform the steps of:

configuring a parameter for an execution unit, performing serialization operation on a parameter configuration character string associated with the parameter, and displaying a serialized character string in a parameter correspondence table associated with the parameter;

performing deserialization operation on the serialized character string at the time of running the graphic program to obtain an actual parameter value desired by the execution unit in the graphic program.

Optionally, as one possible implementation, the processor is further configured to perform the steps of:

establishing a correspondence between type prefix and parameter type; and in a serialization process, obtaining a serialized character string by adding a type prefix to a parameter configuration character string, where an expression of the serialized character string includes a first part which is the type prefix and a second part which is the parameter configuration character string.

Optionally, as one possible implementation, the processor is further configured to perform the steps of:

in a serialization process, firstly determining whether the parameter configuration character string is a non-immediate number;

if the parameter configuration character string is a non-immediate number, obtaining a serialized character string by adding a type prefix to the parameter configuration character string, or directly taking the parameter configuration character string as a serialized character string.

Optionally, as one possible implementation, the processor is further configured to perform the steps of:

in a deserialization process, firstly determining whether a type prefix is present in the serialized character string; if a type prefix is present, extracting the type prefix to identify a parameter type, and performing deserialization operation on the parameter configuration character string based on the parameter type to obtain an actual parameter value.

Optionally, as one possible implementation, the processor is further configured to perform the steps of:

establishing a correspondence between type prefix and parameter type, where the parameter type at least includes one or more of a signal parameter, a system variable, a local variable, a system constant and a path parameter.

One or more embodiments of the present disclosure further provide a computer readable storage medium, storing programs of performing the method of configuring a parameter for a graphic program. The programs are executed by a processor to perform the steps of the method of configuring a parameter for a graphic program. Reference can be made to the specific descriptions of the method of configuring a parameter for a graphic program and no redundant descriptions are made herein.

Figure 8:
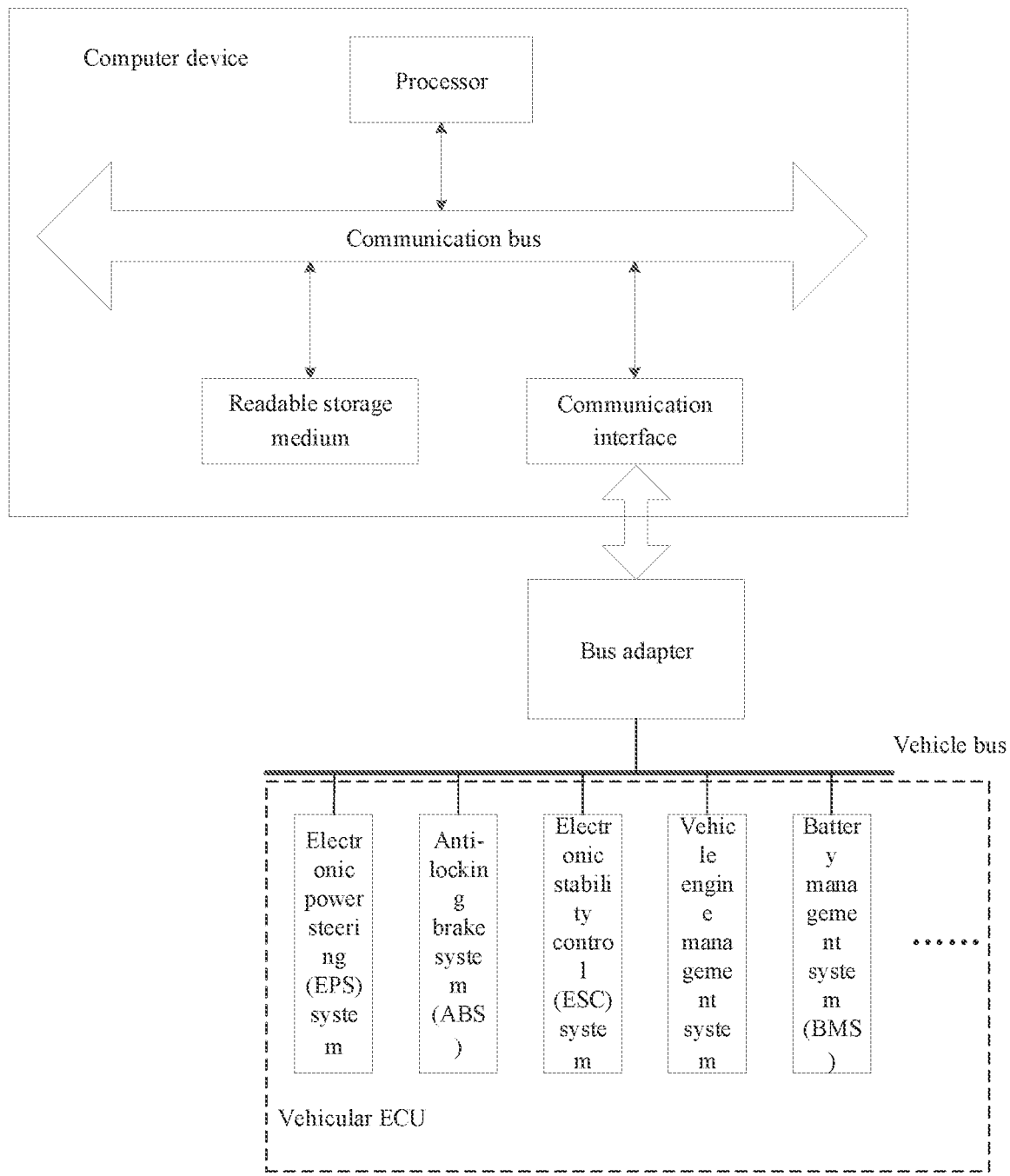
FIG. 8 is a schematic diagram illustrating connection of a vehicular development and debugging system (bus adapter) according to some embodiments of the present disclosure.
Figure 9:
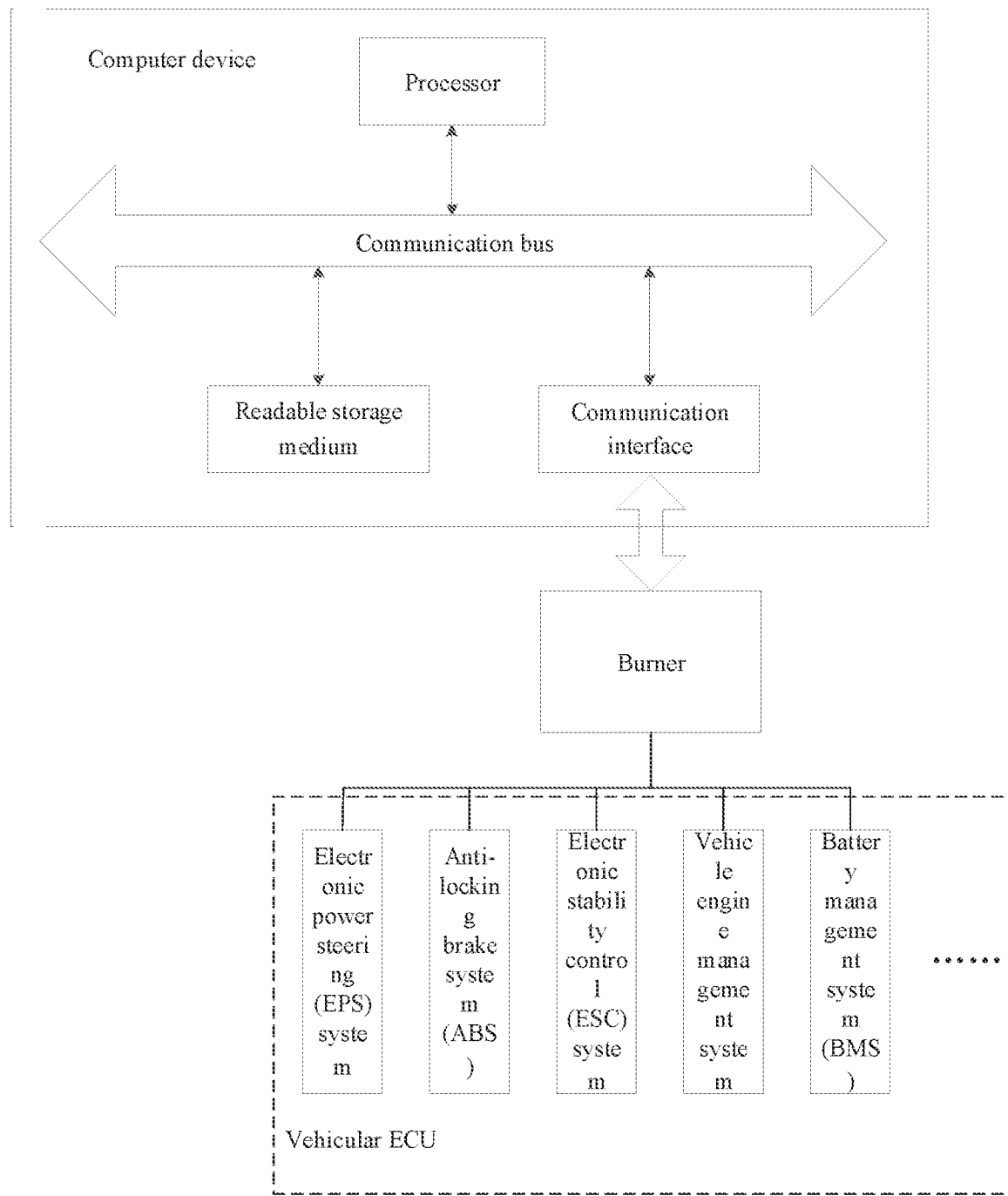
FIG. 9 is a schematic diagram illustrating connection of a vehicular development and debugging system (burner) according to some embodiments of the present disclosure.

As shown in FIGS. 8 and 9, one or more embodiments of the present disclosure further provide a vehicular development and debugging system, including a computer device, a bus adapter or a burner, where, the computer device includes a processor, a readable storage medium, a communication bus and a communication interface;

the readable storage medium is configured to store programs of performing the method of configuring a parameter for a graphic program, and the processor is configured to execute programs of performing the method of configuring a parameter for a graphic program as mentioned above, so as to generate text codes;

the processor, the readable storage medium and the communication interface communicate with the bus adapter via the communication bus;

the processor is further configured to compile at least one fragment of execution codes in the text codes;

the bus adapter is configured to write the compiled execution codes into a debugging device; or, the burner is configured to write the compiled execution codes into the debugging device.

Figure 10:
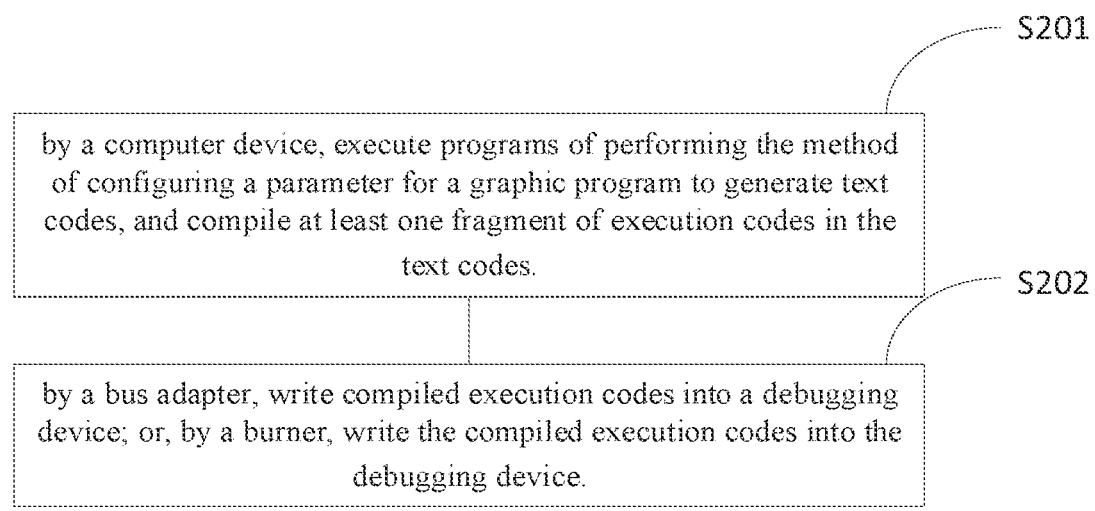
FIG. 10 is a schematic diagram illustrating steps of a vehicular development and debugging method involved in some embodiments of the present disclosure.

As shown in FIG. 10, one or more embodiments of the present disclosure further provide a vehicular development and debugging method, including: at step S201, by a computer device, executing programs of performing the method of configuring a parameter for a graphic program to generate text codes, and compiling at least one fragment of execution codes in the text codes;

at step S202, by a bus adapter, writing compiled execution codes into a debugging device; or, by a burner, writing the compiled execution codes into the debugging device.

In some embodiments, the computer device corresponds to the above electronic device.

In some embodiments, the method of configuring a parameter for a graphic program further includes: establishing a correspondence between type prefix and parameter type; and the serialization operation includes: in a serialization process, obtaining a serialized character string by adding a type prefix to a parameter configuration character string, where an expression of the serialized character string includes a first part which is the type prefix and a second part which is the parameter configuration character string.

In some embodiments, the serialization operation further includes: in a serialization process, firstly determining whether the parameter configuration character string is a non-immediate number; if the parameter configuration character string is a non-immediate number, obtaining a serialized character string by adding a type prefix to the parameter configuration character string, or directly taking the parameter configuration character string as a serialized character string.

In some embodiments, performing deserialization operation on the serialized character string at the time of running the graphic program includes: in a deserialization process, firstly determining whether a type prefix is present in the serialized character string; if a type prefix is present, extracting the type prefix to identify a parameter type, and performing deserialization operation on the parameter configuration character string based on the parameter type to obtain an actual parameter value.

In some embodiments, establishing the correspondence between type prefix and parameter type includes: constructing a correspondence table of type prefix and parameter type.

The processor is configured to compile at least one fragment of execution codes in the text codes; in some embodiments, the compilation of the text codes can be performed by using a cross compiler.

In some embodiments, the bus adapter may be a Controller Area Network (CAN) bus adapter, a Controller Area Network Flexible Data Rate (CANFD) bus adapter, a Fast-LIN bus adapter, a Local Interconnect Network (LIN) bus adapter, an Ethernet bus adapter, a FlexRay bus adapter or may be one to multiple or multiple to multiple, which is not limited for the specific implementation in some other embodiments. In some embodiments, the compiled execution codes may be written by communicating with the debugging device based on Unified Diagnostic Services (UDS), Universal Calibration Protocol (XCP) or CAN Calibration Protocol (CCP).

In some embodiments, the burner may also refer to a programmer.

In some embodiments, the debugging device in the vehicle field may specifically be a vehicular electronic control unit (ECU) and its relevant system, for example, include but not limited to an electronic power steering (EPS) system, an anti-locking brake system (ABS), an electronic stability control (ESC) system, an vehicle engine management system, a battery management system (BMS) and the like, which can be connected to the computer device via the bus to receive and run the compiled execution codes.

In the vehicular development and debugging system of the some embodiments, the specific steps of the method of configuring a parameter for a graphic program are same as those of the above method of configuring a parameter for a graphic program and will not be repeated herein.

One or more embodiments of the present disclosure provide a computer program product, including a computer program or instruction, where the computer program or instruction is executed on a computer to cause the computer to perform any one of the above methods of configuring a parameter for a graphic program.

In some embodiments, a computer readable storage medium, storing computer readable instructions, wherein the computer readable instructions are executed by at least one processor to perform the method: configuring a parameter for an execution unit, performing a serialization operation on a parameter configuration character string associated with the parameter, and displaying a serialized character string in a parameter correspondence table associated with the parameter; performing a deserialization operation on the serialized character string at a time of running the graphic program to obtain an actual parameter value desired by the execution unit in the graphic program.

In some embodiments, a computer program product, including a computer readable storage medium on which computer readable program codes are stored, wherein the computer readable program codes include instructions, which cause at least one processor (one or more computer devices) to perform the following operations: configuring a parameter for an execution unit, performing a serialization operation on a parameter configuration character string associated with the parameter, and displaying a serialized character string in a parameter correspondence table associated with the parameter; performing a deserialization operation on the serialized character string at a time of running the graphic program to obtain an actual parameter value desired by the execution unit in the graphic program.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A vehicular development and debugging system, comprising a computer device, and a bus adapter or a burner, wherein:
the computer device comprises a processor, a readable storage medium, a communication bus and a communication interface, wherein:
the readable storage medium stores programs of performing a method of configuring a parameter for a graphic program, and the processor is configured to execute the programs of performing the method of configuring the parameter for the graphic program-se as to generate text codes for the graphic program;
the processor, the readable storage medium and the communication interface communicate with the bus adapter via the communication bus;
the processor is further configured to compile at least one fragment of execution codes in the text codes to obtain compiled execution codes; and
the bus adapter is configured to write the compiled execution codes into a debugging device; or
the burner is configured to write the compiled execution codes into the debugging device;
wherein the method of configuring the parameter for the graphic program further comprises:
configuring a parameter for an execution unit;
establishing a correspondence between a type prefix and a parameter type;
performing serialization operation on a parameter configuration character string associated with the parameter for the execution unit, wherein the serialization operation comprises obtaining a serialized character string by adding the type prefix to the parameter configuration character string, wherein an expression of the serialized character string comprises a first part and a second part, wherein the first part is the type prefix and the second part is the parameter configuration character string;

displaying the serialized character string in a parameter correspondence table associated with the parameter for the execution unit, wherein the parameter correspondence table comprises the type prefix, the parameter type, and the serialized character string; and performing deserialization operation on the serialized character string at a time of running the graphic program to obtain an actual parameter value by the execution unit in the graphic program.

2. The vehicular development and debugging system of claim 1, wherein the serialization operation further comprises:

in a serialization process, firstly determining whether the parameter configuration character string is a non-immediate number; and when the parameter configuration character string is the non-immediate number, obtaining the serialized character string by adding the type prefix to the parameter configuration character string, or directly taking the parameter configuration character string as the serialized character string.

3. The vehicular development and debugging system of claim 1, wherein the performing the deserialization operation on the serialized character string at the time of running the graphic program comprises:

in a deserialization process, firstly determining whether the type prefix is present in the serialized character string;

when the type prefix is present, extracting the type prefix to identify the parameter type, and performing the deserialization operation on the parameter configuration character string based on the parameter type to obtain an actual parameter value.

4. The vehicular development and debugging system of claim 1, wherein the bus adapter is a Controller Area Network (CAN) bus adapter, a Controller Area Network Flexible Data Rate (CANFD) bus adapter, a FastLIN bus adapter, a Local Interconnect Network (LIN) bus adapter, an Ethernet bus adapter, or a FlexRay bus adapter; and the compiled execution codes are written by communicating with the debugging device based on Unified Diagnostic Services (UDS), Universal Calibration Protocol (XCP) or CAN Calibration Protocol (CCP).

5. The vehicular development and debugging system of claim 1, wherein the debugging device comprises an electronic power steering system, an anti-locking brake system, an electronic stability control system, an vehicle engine management system, and a battery management system.

6. A vehicular development and debugging method, comprising:

by a computer device, executing programs of performing a method of configuring a parameter for a graphic program to generate text codes for the graphic program;

compiling at least one fragment of execution codes in the text codes to obtain compiled execution codes; and writing, by a bus adapter, the compiled execution codes into a debugging device; or writing, by a burner, the compiled execution codes into the debugging device;

wherein the method of configuring the parameter for the graphic program further comprises:

configuring a parameter for an execution unit;

establishing a correspondence between a type prefix and a parameter type;

performing serialization operation on a parameter configuration character string associated with the parameter for the execution unit, wherein the serialization operation comprises obtaining a serialized character string by adding the type prefix to the parameter configuration character string, wherein an expression of the serialized character string comprises a first part and a second part, wherein the first part is the type prefix and the second part is the parameter configuration character string;

displaying the serialized character string in a parameter correspondence table associated with the parameter for the execution unit, wherein the parameter correspondence table comprises the type prefix, the parameter type, and the serialized character string; and performing deserialization operation on the serialized character string at a time of running the graphic program to obtain an actual parameter value by the execution unit in the graphic program.

7. The vehicular development and debugging method of claim 6, wherein the serialization operation further comprises:

in a serialization process, firstly determining whether the parameter configuration character string is a non-immediate number;

when the parameter configuration character string is the non-immediate number, obtaining the serialized character string by adding the type prefix to the parameter configuration character string, or directly taking the parameter configuration character string as the serialized character string.

8. The vehicular development and debugging method of claim 7, wherein the performing the deserialization operation on the serialized character string at the time of running the graphic program comprises:

in a deserialization process, firstly determining whether the type prefix is present in the serialized character string;

when the type prefix is present, extracting the type prefix to identify the parameter type, and performing the deserialization operation on the parameter configuration character string based on the parameter type to obtain an actual parameter value.

9. The vehicular development and debugging method of claim 6, wherein the bus adapter is a CAN bus adapter, a CANFD bus adapter, a FastLIN bus adapter, a LIN bus adapter, an Ethernet bus adapter, or a FlexRay bus adapter; and the compiled execution codes are written by communicating with the debugging device based on UDS, XCP or CCP.

10. The vehicular development and debugging method of claim 6, wherein the debugging device comprises an electronic power steering system, an anti-locking brake system, an electronic stability control system, an vehicle engine management system, and a battery management system.

* * * * *